Patented Nov. 13, 1934

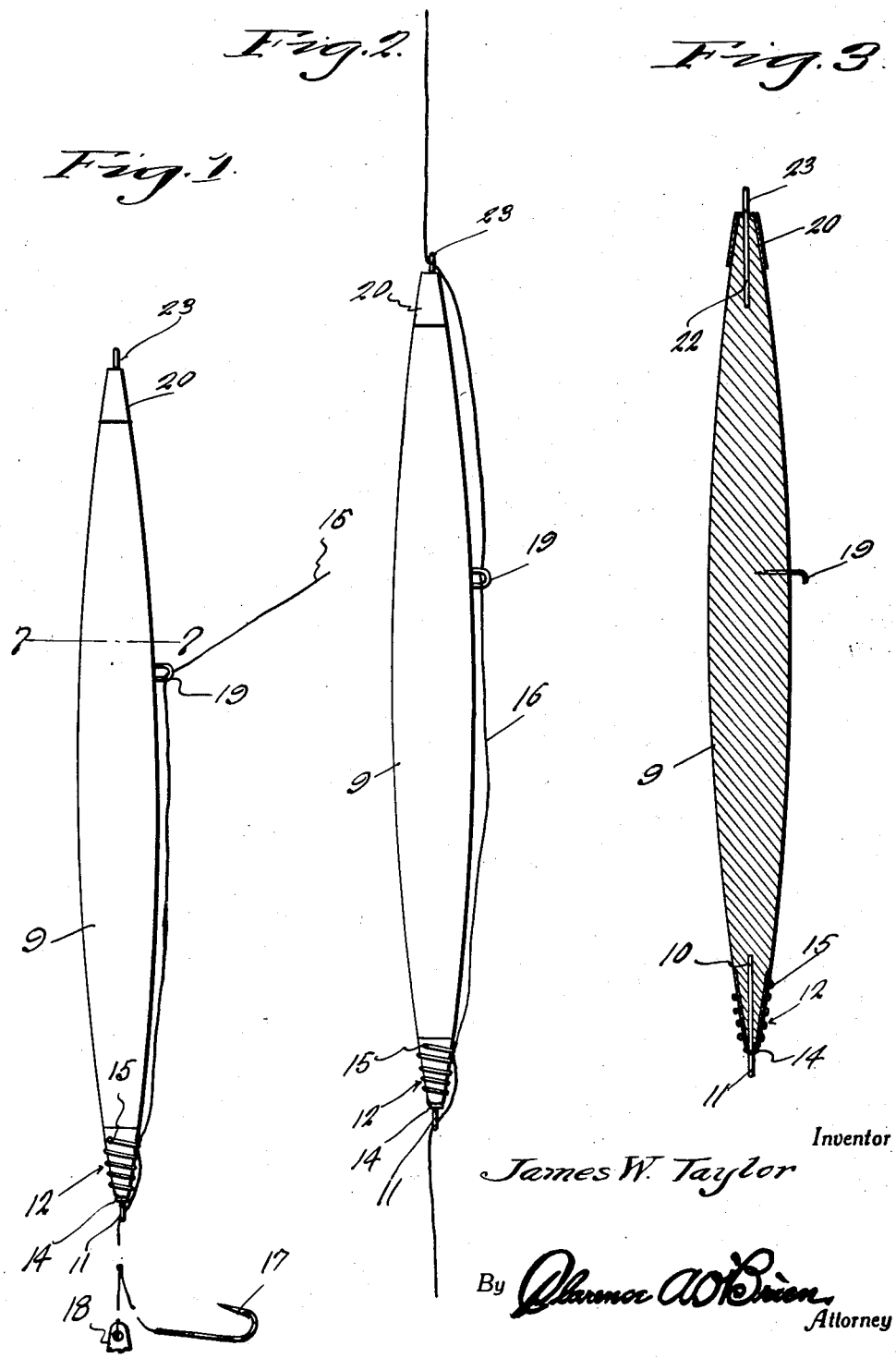

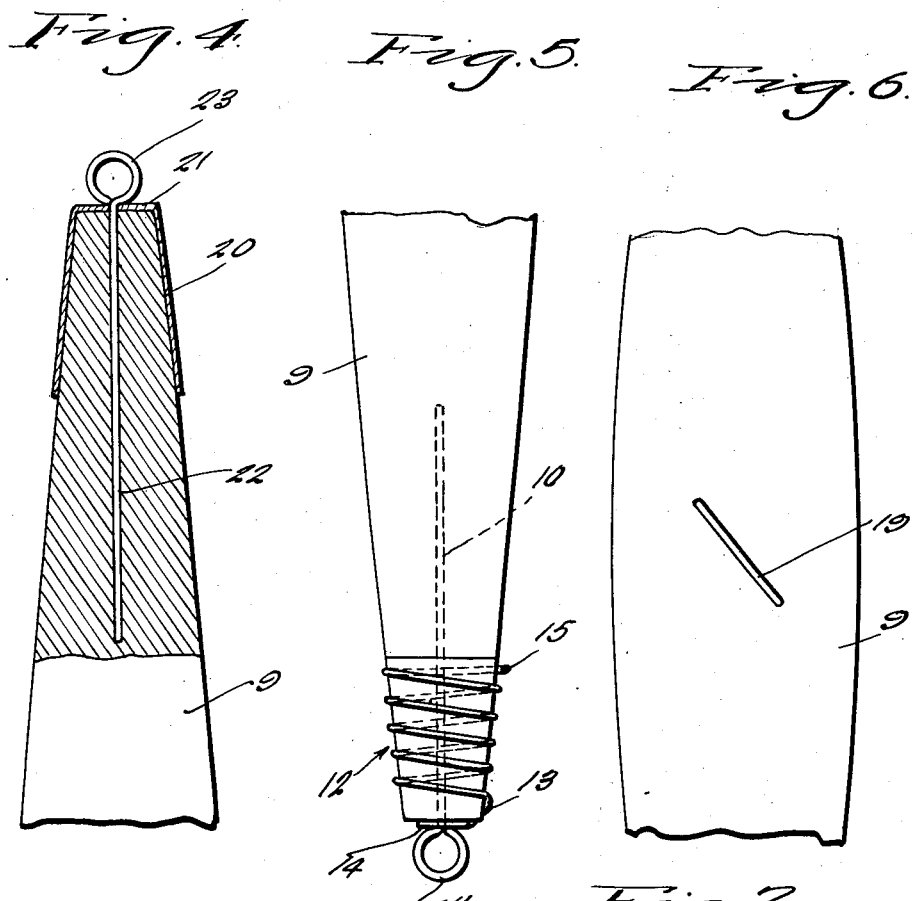

1,980,302

UNITED STATES PATENT OFFICE 1,980,302

FISHING LINE FLOAT

James W. Taylor, Denton, Tex.

Application May 31, 1933, Serial No. 673,737

1 Claim. (Cl. 43—49)

This invention relates to a new and improved float especially designed for use by anglers, the same being structurally perfected and characterized by certain readily recognizable features of improvement and refinement calculated to permit the device to better serve in the capacity for which it is particularly intended.

Impressed with the need for a float susceptible of assuming a substantially perpendicular or erect position in the water, I have evolved and produced an unusually simple and economical structure which accomplishes this desired result in a dependable and satisfactory manner.

One structural feature deserving acclaim and endorsement by the angler is accomplished through the instrumentality of a float possessing requisite buoyant properties and equipped at opposite ends with selectively usable line guide and retention eyes serving several indispensable advantages.

Stated otherwise, I have developed a float having a special clip and eye at one end, wherein the clip, having appropriate resilient characteristics, functions as line retention and tensioning means, and wherein the eye serves to maintain the hook-equipped end of the line in alinement with the longitudinal axis of the body of the float.

Secondly, the eye at the opposite or upper end is associated with a cap-like reinforcing ferrule and is used as a secondary line guide at the discretion of the user and functions to aid the angler in manipulating the float to release it from floating logs and driftwood and to otherwise keep it free of entanglements interfering with sensitive fishing operations.

In the drawings:

Figure 1 is an elevational view of a float and fishing line ensemble associated therewith in the manner in which it is ordinarily used.

Figure 2 is a view like Figure 1 showing the line passing through the upper guide eye to facilitate handling the float when fishing in water laden with floating logs and driftwood.

Figure 3 is a longitudinal sectional view of the float per se with the line omitted.

Figure 4 is an enlarged detail view which exemplifies the upper end construction of the device.

Figure 5 is a fragmentary view of the lower end portion detailing the position and arrangement of the spiral spring line holding and tensioning clip or unit.

Figure 6 is a fragmentary view of the central portion of the float.

Figure 7 is a cross section on the line 7—7 of Figure 1.

Figure 8 is a detail perspective view of the spiral spring clip or unit by itself.

Referring now to the drawings by distinguishing reference numerals, it will be observed that the body portion of the float is denoted by the numeral 9, the same being of wood of an appropriate texture possessing requisite buoyant properties. By preference, it is of longitudinally elongated design or configuration and in practice is painted or otherwise coated with waterproof material which may be applied to obtain the requisite camouflage effect whenever necessary or desired.

Attention is first invited to the accessories on the lower end of the body illustrated in Figure 5. Here the numeral 10 designates what might well be described as a nail or pin which is driven centrally into the wood body, the same terminating in a centralized guide eye 11. Closely allied with this guide eye and pin is a unit which may be conveniently differentiated as a resilient line holding and tensioning clip 12. This is in the nature of a spiral or helical spring whose convolutions are proportioned to snugly and resiliently embrace and comform to that portion of the float illustrated in the drawings.

The lowermost convolution is laterally bent into somewhat L-shaped form as indicated at 13 and terminates in a loop 14 which loop is arranged flat against the extreme lower end of the float body and which serves to permit the shank of the pin or nail to be passed therethrough whereby to permit said pin to have the additional function of properly securing the clip in operative position. This is believed to be a unique manufacturing and assembling feature.

The uppermost convolution, denoted by the numeral 15, has its extremity bent to space it slightly from the body of the float and to facilitate placement and retention of the adjacent portion of the fishing line 16. Incidently, as shown in Figure 1, the numeral 17 designates a fishing hook, and 18 a sinker, and the arrangement shown in both Figures 1 and 2 is such that this end portion of the line is maintained in more or less direct longitudinal alinement with the axis of the body of the float, that is, centrally located, the thought being to keep the float in a perpendicular position in the water because of this centralized concentration of the point of pull of the line with respect to the float.

I next call attention to the numeral 19 which designates a staple which functions as an additional guide, this being arranged on the intermediate portion of the float and the line passing therethrough as shown in Figure 1, whereby the lower end portion of the line runs alongside of the float.

In Figure 4, the numeral 20 designates a cap-like ferrule which fits over the upper end of the float the disc-like portion 21 thereof being centrally apertured to accommodate the shank 22 of a second pin or nail carrying an individual guide eye 23 also centrally located at the extreme upper end of the float. Thus, we have two guide eyes at opposite ends of the float, these being used according to the discretion of the fisherman.

It is to be mentioned in connection with this ferrule and guide eye 23 that the latter guide eye also serves as a line guide to be used only when fishing in drift or around floating logs, whereby to permit the float to be controlled and to be disengaged from such floating objects and to prevent hanging and interfering with expeditious operation.

The presence of the special helical or spiral spring clip on the lower end of the float permits it to serve as a retainer and tensioning device for the adjacent portion of the fishing line. The line may be easily engaged or disengaged from the terminal 15. Moreover, this arrangement permits expeditious adjustment or regulation of the requisite tension for the line. Then too, the coiled spring serves as an adapter in that it possesses the necessary resilient properties for tensioning means as well as for accommodation of itself to the part of the float with which it co-operates. Not only this, the coil spring functions as a protector for the rather fragile lower end of the float by preventing splitting and also provides a convenient finger grip.

As before stated, particular emphasis is placed on the laterally directed lower end portion 13 terminating in the loop 14 to permit the shank 10 of the nail to be passed therethrough and anchored in the wood whereby to provide a convenient means of assembling and maintaining these particular features. The central location of the guide eye 11 is particularly important in that it suspends the line directly beneath the bottom of the float and allows the float to stand perpendicular in the water.

The guide staple 19 permits the line to run alongside of the float and to properly position and facilitate control of the float, said staple being near the normal water level and being particularly handy to counteract wave disturbance and the action of rough water, tending to interfere with the desired perpendicular position of the float. This arrangement also facilitates extraction or withdrawal of the float and suspended part of the line in a more or less perpendicular manner, which is also thought to be an advantage in an assemblage of this type.

I claim:

A device of the class described comprising a float, a spiral spring clip embracing the lower end portion of the float and having its upper convolution formed into a retention finger, the lower end portion thereof being directed laterally and formed into an attaching loop, said loop being seated against the lower end of the float, and a straight pin passing into the lower end of the float through said loop, said pin terminating at its lower end in a guide eye for the line, said eye contacting the loop.

JAMES W. TAYLOR.